Patented Apr. 18, 1950

2,504,605

UNITED STATES PATENT OFFICE 2,504,605

METHOD FOR PREPARING SEALING COMPOSITION FOR STORAGE BATTERIES

Leighton John Thomas, Philadelphia, Pa., assignor to The Electric Storage Battery Company, a corporation of New Jersey No Drawing. Application March 4, 1947, Serial No. 732,382

4 Claims. (Cl. 260—758)

This invention relates to improvements in compositions for sealing storage batteries and methods for preparing the same.

An object of the invention is to provide improved battery sealing compositions characterized by increased ductility and better adhesive qualities than other battery sealing compositions with which I am familiar.

The present invention is concerned with compositions that contain asphalt and rubber as the principal ingredients. The compositions also may contain additional ingredients to improve the adhesion, such ingredients being resins such as paracumarone-indene or oils such as rosin oil or mineral oil. I am aware that admixtures or blends of asphalt and rubber have found many applications in the past. Nevertheless, I have discovered novel methods of combining these ingredients, either by themselves or with a resin or an oil, in order to form battery sealing compositions having the improved qualities mentioned.

Accordingly a further object of the invention is to provide improved methods for preparing battery sealing compositions by blending asphalt and rubber, either alone or with a resin or an oil, in the novel manner hereinafter set forth.

The asphalt I prefer to employ is of a grade that alone may be used as a battery sealing compound. It has a melting point within the range 160° to 200° Fahrenheit. Prior to the addition of rubber, the resin or oil may be blended with the asphalt in amounts up to about 20 percent of the total weight (asphalt plus resin or oil). The resin or oil is added directly to the asphalt while the latter is in a molten condition and mixed by any suitable method. When the asphalt contains a sufficient quantity of the paraffin or mineral oil naturally present, addition of resin or oil is not necessary. Of the resins or oils that may be added, I prefer rosin oil.

According to the present invention, a quantity of asphalt or asphalt plus resin or oil is melted and heated to a temperature a little above the boiling point of water, preferably about 220° Fahrenheit. Latex containing 30 to 60 percent rubber solids and the remainder water is added to the molten asphalt. The mixture is agitated and the temperature maintained until substantially all of the water in the latex is expelled. To assist in the blending a small amount of a wetting agent, of which many are known, may be included in the mixture. Also sulfur may be added as a vulcanizing agent. More asphalt is added after the water is expelled. The resulting mixture is heated to approximately 400° Fahrenheit for a period of about one hour or longer and agitated to produce a complete blending of the ingredients.

The proportions of ingredients employed is such that the final sealing composition contains 1 to 20 percent by weight dry rubber solids. Approximately one-third of the quantity used of asphalt or asphalt plus resin or oil is melted initially and the latex is added thereto. The other two-thirds of the asphalt is added after the water is expelled from the latex. Sulfur may be added in amounts up to 30 percent of the weight of rubber solids. When sulfur is used, the rubber vulcanizes during heating and the sulfur enters into combination therewith. However, a satisfactory composition is provided irrespective of whether the rubber is vulcanized or unvulcanized.

The finished composition consists of the ingredients mentioned in the following ranges by weight:

| | Percent |
|---|---|
| Asphalt | 99 to 60 |
| Resin or oil | 0 to 20 |
| Rubber, based on dry rubber solids | 1 to 20 |

When resin or oil is not used, the minimum content of asphalt is about 80 percent, since it has not been found desirable to employ more than 20 percent of rubber.

The preferred composition consists of these ingredients in the following proportions by weight:

| | Percent |
|---|---|
| Asphalt | About 85 |
| Rosin oil | About 10 |
| Rubber, based on dry rubber solids | About 5 |

The standard test for ductility of bituminous materials is A. S. T. M., Designation D-113-44, described in A. S. T. M. Standards 1944, Part II, pages 556-558, published by the American Society for Testing Materials, Philadelphia, Pennsylvania.

Three samples of sealing composition tested according to this standard test showed the following values for ductility:

A

| | Cm. |
|---|---|
| Straight asphalt | 2.8 |

B

| | |
|---|---|
| Asphalt, 90 percent; rosin oil 10, percent | 4.0 |

C

| | |
|---|---|
| Asphalt, 85 percent; rosin oil, 10 percent; rubber, 5 percent, incorporated by the methods described hereinbefore | 7.5 |

A measure of adhesion of battery sealing compositions is furnished by connecting two strips with the compound, applying tension to the joint so formed, and observing whether the joint fails due to the sealing compound's parting from one of the strips or whether the mass of sealing compound breaks leaving part on each strip. The second manner of failure (referred to as "½ and ½") indicates better adhesion than the first (referred to as "1-0").

Samples A, B and C sealing compositions tested for adhesion in this manner gave results as follows:

| | |
|---|---|
| A. (Fresh) | ½ and ½ |
| B. (Fresh) | ½ and ½ |
| C. (Fresh) | ½ and ½ |
| A. (Maintained hot 48 hours) | 1-0 |
| B. (Maintained hot 48 hours) | ½ and ½ |
| C. (Maintained hot 48 hours) | ½ and ½ |

It is therefore seen that I have provided battery sealing compositions having improved ductility and adhesion over battery sealing compositions as previously used.

While I have described but certain exemplary compositions and methods of preparation, it is apparent that modifications may arise.

Therefore I do not wish to be limited by the disclosure set forth, but only by the scope of the appended claim.

I claim:

1. A method for preparing battery sealing compositions comprising the steps of melting and heating asphalt to a temperature above the boiling point of water, adding latex containing 30 to 60 percent rubber solids to the molten asphalt, agitating the mixture and maintaining the temperature until the water in the latex is expelled, adding more asphalt, and heating the mixture to a temperature of about 400° Fahrenheit and continuing the agitation, the initial quantity of asphalt being about one-third of the total thereof and the content of rubber solids in the finished composition being from 1 to 20 percent.

2. A method for preparing battery sealing compositions comprising the steps of melting and heating a blend of asphalt and rosin oil containing 1 to 20 percent by weight rosin oil to a temperature above the boiling point of water, adding latex containing 30 to 60 percent rubber solids to the molten blend of asphalt and rosin oil, agitating the mixture and maintaining the temperature until the water in the latex is expelled, adding more of the blend of asphalt and rosin oil, and heating the mixture to about 400° Fahrenheit and continuing the agitation, the initial quantity of asphalt and rosin oil being about one-third of the total thereof, and the content of rubber solids in the finished composition being from 1 to 20 percent.

3. A method as set forth in claim 1 including the additional step of vulcanizing the rubber by addition of sulphur in amounts of 10 to 30 percent of the weight of rubber.

4. A method as set forth in claim 2 including the additional step of vulcanizing the rubber by addition of sulfur in amounts of 10 to 30 percent of the weight of rubber.

LEIGHTON JOHN THOMAS.

REFERENCES CITED

The following references are of record in the file of this patent:

UNITED STATES PATENTS

| Number | Name | Date |
|---|---|---|
| 1,563,410 | Weiss | Dec. 1, 1925 |
| 1,886,334 | Gabriel | Nov. 1, 1932 |
| 2,053,281 | Gayenne | Sept. 8, 1936 |
| 2,092,332 | Plaizier et al. | Sept. 7, 1937 |
| 2,166,236 | Crawford | July 18, 1939 |
| 2,210,348 | Swope | Aug. 6, 1940 |
| 2,265,770 | Crawford | Dec. 9, 1941 |
| 2,431,384 | Fischer | Nov. 25, 1947 |

FOREIGN PATENTS

| Number | Country | Date |
|---|---|---|
| 254,004 | Great Britian | June 25, 1926 |